United States Patent
Li et al.

(10) Patent No.: US 12,185,357 B2
(45) Date of Patent: Dec. 31, 2024

(54) PRIORITIZED RESOURCE OVERLAP TRANSMISSION METHOD ACCORDING TO DCI, TERMINAL, AND NETWORK SIDE DEVICE

(71) Applicant: VIVO MOBILE COMMUNICATION CO., LTD., Guangdong (CN)

(72) Inventors: Na Li, Guangdong (CN); Xueming Pan, Guangdong (CN); Xiaodong Shen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 352 days.

(21) Appl. No.: 17/717,281

(22) Filed: Apr. 11, 2022

(65) Prior Publication Data
US 2022/0240266 A1 Jul. 28, 2022

Related U.S. Application Data

(63) Continuation of application No. PCT/CN2020/119900, filed on Oct. 9, 2020.

(30) Foreign Application Priority Data

Oct. 12, 2019 (CN) .......... 201910970044.X

(51) Int. Cl.
*H04W 72/56* (2023.01)
*H04W 72/0446* (2023.01)
(Continued)

(52) U.S. Cl.
CPC ....... *H04W 72/56* (2023.01); *H04W 72/0446* (2013.01); *H04W 72/23* (2023.01); *H04W 76/30* (2018.02)

(58) Field of Classification Search
CPC . H04W 72/56; H04W 72/0446; H04W 72/23; H04W 76/30; H04W 72/566; H04W 72/12; H04W 72/569; H04L 5/0053
See application file for complete search history.

(56) References Cited

U.S. PATENT DOCUMENTS

2014/0355559 A1* 12/2014 Gao ............... H04L 5/0005
370/330
2019/0327755 A1* 10/2019 Xiong ............ H04L 5/0046
(Continued)

FOREIGN PATENT DOCUMENTS

CN 108260221 A 7/2018
CN 109392101 A 2/2019
(Continued)

OTHER PUBLICATIONS

Ericsson, "Physical Layer Enhancements for Intra-UE Prioritization and Multiplexing", 3GPP TSG RAN WG1 Meeting #96, Tdoc R1-1901601, Athens, Greece, Feb. 25-Mar. 1, 2019.
(Continued)

*Primary Examiner* — Afshawn M Towfighi
(74) *Attorney, Agent, or Firm* — Price Heneveld LLP

(57) ABSTRACT

An information transmission method, an information receiving method, a terminal, and a network side device are provided. The information transmission method is applied to a terminal, and includes: in a case that there is resource overlap between a first object having a first priority and a second object having a second priority, canceling transmission of the second object and transmitting the first object according to whether the first object and the second object have corresponding downlink control information DCI, the first object including a first physical channel or a first signal,
(Continued)

the second object including a second physical channel or a second signal, the first priority being higher than the second priority.

12 Claims, 9 Drawing Sheets

(51) Int. Cl.
*H04W 72/23* (2023.01)
*H04W 76/30* (2018.01)

(56) References Cited

U.S. PATENT DOCUMENTS

| | | | |
|---|---|---|---|
| 2020/0178263 A1 | 6/2020 | Shao | |
| 2021/0068142 A1* | 3/2021 | Park | H04W 72/0453 |
| 2022/0150918 A1* | 5/2022 | Xu | H04W 72/23 |
| 2022/0159701 A1* | 5/2022 | Islam | H04L 5/0053 |

FOREIGN PATENT DOCUMENTS

| | | |
|---|---|---|
| CN | 109392126 A | 2/2019 |
| EP | 3220698 A1 | 9/2017 |
| WO | 2018204513 A1 | 11/2018 |
| WO | 2019160319 A1 | 8/2019 |

OTHER PUBLICATIONS

VIVO, "UL intra UE Tx prioritization for URLLC", 3GPP TSG RAN WG1 #96, R1-1901698, Athens, Greece, Feb. 25-Mar. 1, 2019.

Huawei, HiSilicon, "Intra-UE transmission prioritization and multiplexing", 3GPP TSG RAN WG1 Meeting #96, R1-1903081, Athens, Greece, Feb. 25-Mar. 1, 2019.

Moderator (Qualcomm), "Summary of the Remaining Issues on HARQ and Scheduling Enhancements for URLLC: Preparation Phase", 3GPP TSG RAN WG1 #102e, R1-2007033, Aug. 17-28, 2020.

* cited by examiner

PRIORITIZED RESOURCE OVERLAP TRANSMISSION METHOD ACCORDING TO DCI, TERMINAL, AND NETWORK SIDE DEVICE

CROSS-REFERENCE TO RELATED APPLICATIONS

This application is a continuation application of International Application No. PCT/CN2020/119900 filed on Oct. 9, 2020, which claims priority to Chinese Patent Application No. 201910970044.X, filed in China on Oct. 12, 2019, which are incorporated herein by reference in their entireties.

TECHNICAL FIELD

The present disclosure relates to the field of communication technologies, and in particular, to an information transmission method, an information receiving method, a terminal, and a network side device.

BACKGROUND

Compared with existing mobile communication systems, future $5^{th}$ Generation (5G) mobile communication systems need to adapt to more diversified scenarios and service requirements. Main scenarios of 5G include enhanced mobile broadband (eMBB), Ultra-Reliable and Low Latency Communications (URLLC), and massive machine type of communication (mMTC). These scenarios raise high requirements such as high reliability, low latency, large bandwidth, and wide coverage on systems. Some user equipments (User Equipment, UE, also referred to as terminals) may support different services. For example, UE supports both a high-reliability low-latency URLLC service and a large-capacity high-rate eMBB service. In a new radio (NR) system, because different channels may have different starting symbols and lengths, time domain overlap may occur in transmission resources. However, there is no transmission solution for this case in the related art, and as a result effective transmission of a high-priority service cannot be ensured.

SUMMARY

Embodiments of the present disclosure provide an information transmission method, an information receiving method, a terminal, and a network side device.

According to a first aspect, embodiments of the present disclosure provide an information transmission method, applied to a terminal, and including:

in a case that there is resource overlap between a first object having a first priority and a second object having a second priority, canceling transmission of the second object and transmitting the first object according to whether the first object and the second object have corresponding downlink control information DCI, the first object including a first physical channel or a first signal, the second object including a second physical channel or a second signal, the first priority being higher than the second priority.

According to a second aspect, embodiments of the present disclosure further provide an information receiving method, applied to a network side device, and including:

in a case that there is resource overlap between a first object having a first priority and a second object having a second priority, receiving, according to whether the first object and the second object have corresponding downlink control information DCI, the first object transmitted by a terminal, the first object including a first physical channel or a first signal, the second object including a second physical channel or a second signal, the first priority being higher than the second priority.

According to a third aspect, embodiments of the present disclosure further provide a terminal, including:

a transmission module, configured to: in a case that there is resource overlap between a first object having a first priority and a second object having a second priority, cancel transmission of the second object and transmit the first object according to whether the first object and the second object have corresponding downlink control information DCI, the first object including a first physical channel or a first signal, the second object including a second physical channel or a second signal, the first priority being higher than the second priority.

According to a fourth aspect, embodiments of the present disclosure further provide a terminal, including: a memory, a processor, and a computer program stored in the memory and capable of being run on the processor, where the computer program implements the steps of the foregoing information transmission method when being executed by the processor.

According to a fifth aspect, embodiments of the present disclosure further provide a network side device, including:

a receiving module, configured to: in a case that there is resource overlap between a first object having a first priority and a second object having a second priority, receive, according to whether the first object and the second object have corresponding downlink control information DCI, the first object transmitted by a terminal, the first object including a first physical channel or a first signal, the second object including a second physical channel or a second signal, the first priority being higher than the second priority.

According to a sixth aspect, embodiments of the present disclosure further provide a network side device, including: a memory, a processor, and a computer program stored in the memory and capable of being run on the processor, where the computer program implements the steps of the foregoing information receiving method when being executed by the processor.

According to a seventh aspect, embodiments of the present disclosure further provide a computer-readable storage medium. The computer-readable storage medium stores a computer program, and the computer program implements the steps of the foregoing information transmission method or the steps of the foregoing information receiving method when being executed by a processor.

DETAILED DESCRIPTION

To make the objectives, the technical solutions, and advantages of the present disclosure, detailed description of the present disclosure is made below with reference to the accompanying drawings and specific embodiments.

In view of the problem of how to ensure effective transmission of a high-priority channel/signal when there is time domain overlap between a high-priority service and a low-priority service in the related art, the present disclosure provides an information transmission method, an information receiving method, a terminal, and a network side device.

Figure 1:
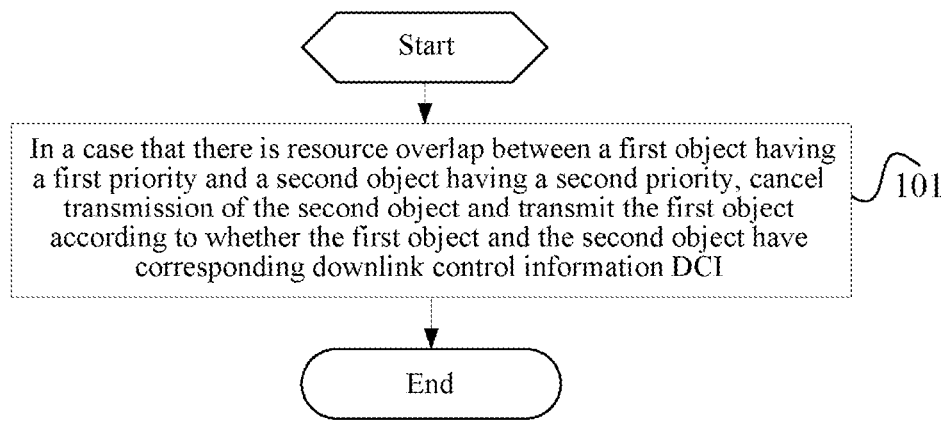
FIG. 1 is a schematic flowchart of an information transmission method according to an embodiment of the present disclosure.

As shown in FIG. 1, embodiments of the present disclosure provide an information transmission method, applied to a terminal, and including the following steps.

Step 101: If there is resource overlap between a first object having a first priority and a second object having a second priority, cancel transmission of the second object and transmit the first object according to whether the first object and the second object have corresponding downlink control information DCI.

The first object includes a first physical channel or a first signal, and the second object includes a second physical channel or a second signal.

The first priority is higher than the second priority. That is, in the embodiments of the present disclosure, the first object is a high-priority physical channel or signal, and the second object is a low-priority physical channel or signal.

It should be noted that when there is resource overlap between a high-priority physical channel or signal and a low-priority physical channel or signal, the terminal preferentially ensures transmission of the high-priority physical channel or signal, so that a transmission delay of the high-priority physical channel or signal can be reduced.

Specific implementations of step 101 are described below from the perspectives of whether the first object and the second object have corresponding DCI.

It should be noted that the physical channel or signal having corresponding DCI may include: a hybrid automatic repeat request acknowledgment physical uplink control channel (HARQ-ACK PUCCH), a dynamic grant physical uplink shared channel (dynamic grant PUSCH), an aperiodic CSI physical uplink shared channel (A-CSI only on PUSCH), and the like. The physical channel or signal having no corresponding DCI may include: a channel state information physical uplink control channel (CSI PUCCH), a scheduling request (SR), an uplink sounding reference signal (SRS), a physical random access channel (PRACH), a configured grant physical uplink shared channel (configured grant PUSCH), semi-persistent CSI on a physical uplink shared channel (SP CSI on PUSCH), and the like.

1. In a case that the first object has corresponding DCI

It should be noted that in this case, a specific implementation of step 101 is: canceling (dropping/canceling, where the canceling mentioned in the embodiments of the present disclosure may also be understood as discarding) transmission of the second object and transmitting the first object when a time interval between an ending symbol of a control resource set (CORESET) in which the DCI corresponding to the first object is located and a starting symbol of a first resource is greater than or equal to a first preset time.

It should be noted that the first resource is a symbol set of a resource overlapping part of the first object and the second object.

Because there are two different combinations for the first object having corresponding DCI, specific implementation behaviors of the terminal under the two combinations are separately described below.

Case 1. Both the first object and the second object have corresponding DCI.

In this case, when the time interval between the ending symbol of the control resource set in which the DCI corresponding to the first object is located and the starting symbol of the first resource is greater than or equal to the first preset time (the first preset time is determined by a processing capability corresponding to the first object, and a specific value of the first preset time may be related to a processing capability of the terminal), transmission of the second object later than a first moment (that is, a moment corresponding to the first preset time later than the ending symbol of the control resource set in which the DCI corresponding to the first object is located) is canceled and the first object is transmitted.

Specifically, it is undesirable for the terminal that DCI corresponding to a low-priority physical channel or signal is received after DCI corresponding to a high-priority physical channel or signal. That is, the DCI corresponding to the first object is later than the DCI corresponding to the second object. Therefore, in this case, when an interval between the ending symbol of the control resource set in which the DCI corresponding to the first object is located and a starting symbol of the second object is greater than or equal to the first preset time, the terminal needs to cancel transmission of all second objects.

It should be noted that if DCI corresponding to a low-priority physical channel or signal may be received after DCI corresponding to a high-priority physical channel or signal, the foregoing time interval between the ending symbol of the control resource set in which the DCI corresponding to the first object is located and the starting symbol of the first resource being greater than or equal to the first preset time should be that a time interval between an ending symbol of a control resource set in which DCI (for example, DCI with a later starting symbol or with a later ending symbol) received later in the DCI corresponding to the first object and the DCI corresponding to the second object is located and the starting symbol of the first resource is greater than or equal to the first preset time.

Figure 2:
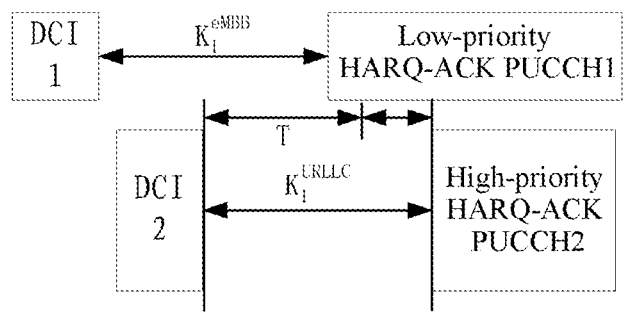
FIG. 2 is a schematic diagram 1 of a case in which a starting symbol of a URLLC HARQ-ACK PUCCH is later than an eMBB HARQ-ACK PUCCH.
Figure 3:
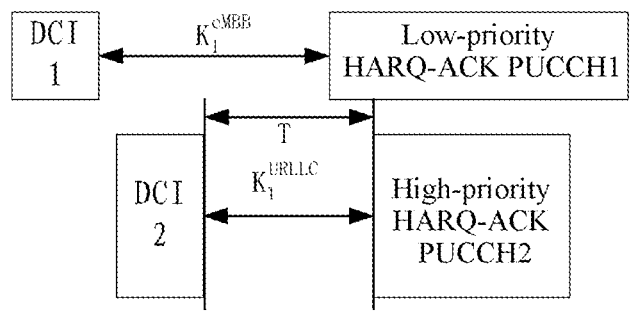
FIG. 3 is a schematic diagram 2 of a case in which a starting symbol of a URLLC HARQ-ACK PUCCH is later than an eMBB HARQ-ACK PUCCH.
Figure 4:
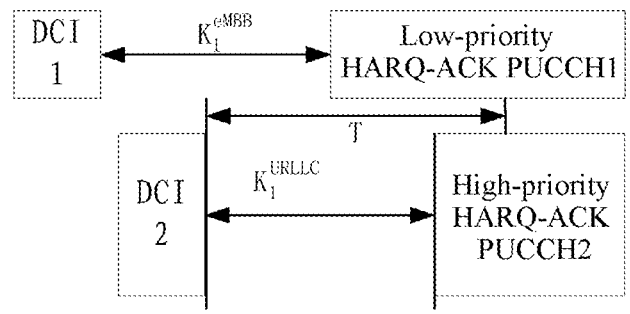
FIG. 4 is a schematic diagram 3 of a case in which a starting symbol of a URLLC HARQ-ACK PUCCH is later than an eMBB HARQ-ACK PUCCH.
Figure 5:
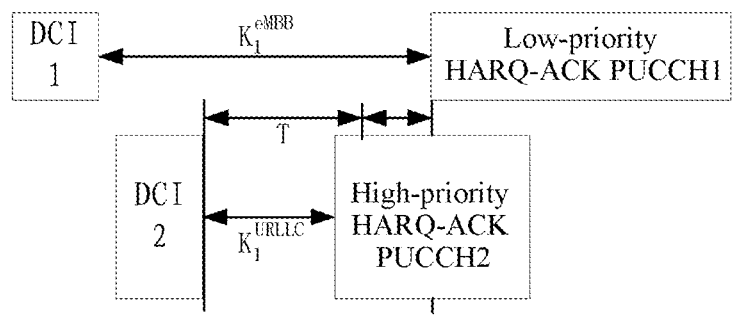
FIG. 5 is a schematic diagram 1 of a case in which a starting symbol of a URLLC HARQ-ACK PUCCH is earlier than an eMBB HARQ-ACK PUCCH.
Figure 6:
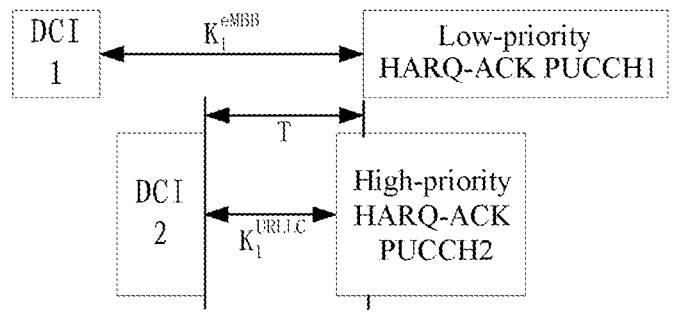
FIG. 6 is a schematic diagram 2 of a case in which a starting symbol of a URLLC HARQ-ACK PUCCH is earlier than an eMBB HARQ-ACK PUCCH.
Figure 7:
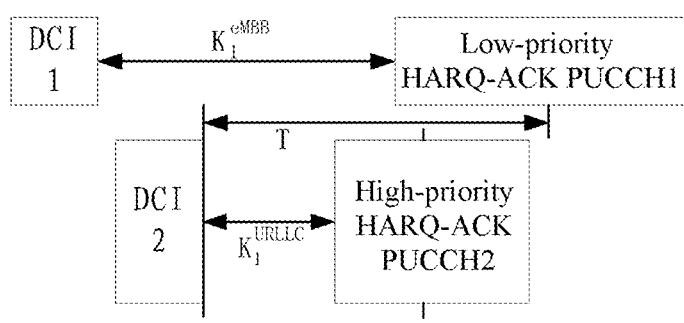
FIG. 7 is a schematic diagram 3 of a case in which a starting symbol of a URLLC HARQ-ACK PUCCH is earlier than an eMBB HARQ-ACK PUCCH.

For example, FIG. 2 to FIG. 7 are schematic diagrams of a case in which a low-priority channel HARQ-ACK PUCCH1 (for example, an eMBB HARQ-ACK PUCCH) and a high-priority channel HARQ-ACK PUCCH2 (for example, a URLLC HARQ-ACK PUCCH) overlap in a time domain resource (the same serving cell, a PCell or a PSCell). Both a low-priority HARQ-ACK and a high-priority HARQ-ACK are feedbacks for a dynamic grant PDSCH or an SPS PDSCH release PDCCH, that is, have corresponding DCI. DCI1 is DCI (that is, last DCI corresponding to an eMBB HARQ-ACK) corresponding to an eMBB HARQ-ACK PUCCH, and DCI2 is DCI (that is, last DCI corresponding to a URLLC HARQ-ACK) corresponding to a URLLC HARQ-ACK PUCCH. The terminal cancels transmission of low-priority HARQ-ACK PUCCH1 and transmits high-priority HARQ-ACK PUCCH2. The following time requirements need to be satisfied:

A time interval between an ending symbol of a CORESET in which DCI (that is, DCI2) corresponding to high-priority HARQ-ACK PUCCH2 is located and a starting symbol of an overlapping part between high-priority HARQ-ACK PUCCH2 and low-priority HARQ-ACK PUCCH1 is greater than or equal to a time T (that is, T shown by the arrow in the figure, and corresponds to the foregoing first preset time; it should be noted that T in the embodiments of the present disclosure may be Tproc2, and Tproc2 is a processing time of a PUSCH defined in protocols). Specifically, FIG. 2 and FIG. 5 show a case in which the time interval between the ending symbol of the CORESET in which DCI2 is located and the starting symbol of the overlapping part is greater than T, FIG. 3 and FIG. 6 show a case in which the time interval between the ending symbol of the CORESET in which DCI2 is located and the starting symbol of the overlapping part is equal to T, and FIG. 4 and FIG. 7 show a case in which the time interval between the ending symbol of the CORESET in which DCI2 is located and the starting symbol of the overlapping part is less than T. It should be noted that T is determined by a processing capability (for example, CAP #2) corresponding to transmission of a high-priority channel.

The terminal cancels transmission of low-priority HARQ-ACK PUCCH1 later than the ending symbol of the CORESET in which the DCI corresponding to high-priority HARQ-ACK PUCCH2 is located+T, and transmits high-priority HARQ-ACK PUCCH2.

As shown in FIG. 2 and FIG. 3, the terminal cancels transmission of a part of low-priority HARQ-ACK PUCCH1 later than the ending symbol of the CORESET in which the DCI corresponding to high-priority HARQ-ACK PUCCH2 is located+T. This is cancellation of a part of transmission of low-priority HARQ-ACK PUCCH1.

As shown in FIG. 5 and FIG. 6, the terminal cancels transmission of all low-priority ARQ-ACK PUCCH1.

It should be noted that the cases shown in FIG. 4 and FIG. 7 are not desirable for the terminal.

Case 2. The first object has corresponding DCI and the second object does not have corresponding DCI.

In this case, transmission of the second object later than the first moment is canceled and the first object is transmitted when the time interval between the ending symbol of the control resource set in which the DCI corresponding to the first object is located and the starting symbol of the first resource is greater than or equal to the first preset time.

It should be further noted that the terminal cancels transmission of all second objects when the interval between the ending symbol of the control resource set in which the DCI corresponding to the first object is located and the starting symbol of the physical resource corresponding to the second object is greater than or equal to the first preset time.

Figure 8:
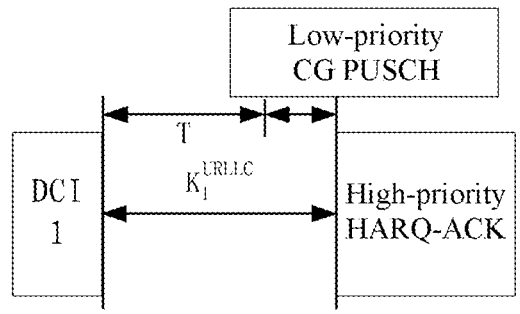
FIG. 8 is a schematic diagram 1 of a case in which a starting symbol of a URLLC HARQ-ACK PUCCH is later than an eMBB CG PUSCH.
Figure 9:
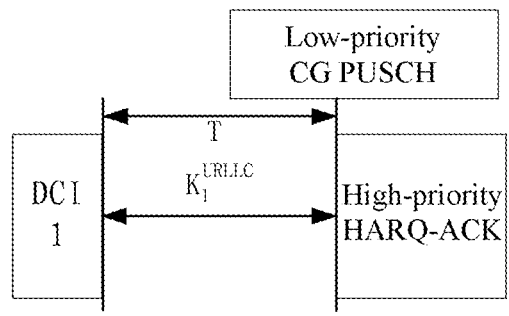
FIG. 9 is a schematic diagram 2 of a case in which a starting symbol of a URLLC HARQ-ACK PUCCH is later than an eMBB CG PUSCH.
Figure 10:
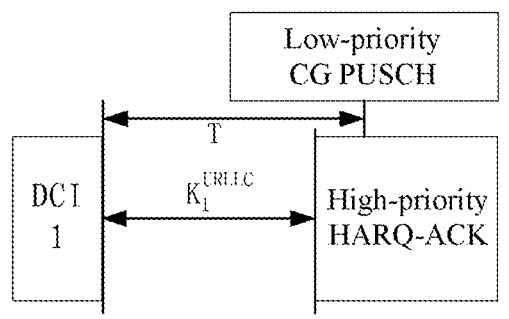
FIG. 10 is a schematic diagram 3 of a case in which a starting symbol of a URLLC HARQ-ACK PUCCH is later than an eMBB CG PUSCH.
Figure 11:
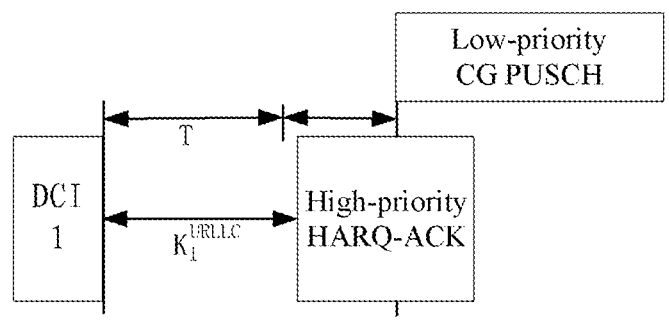
FIG. 11 is a schematic diagram 1 of a case in which a starting symbol of a URLLC HARQ-ACK PUCCH is earlier than an eMBB CG PUSCH.
Figure 12:
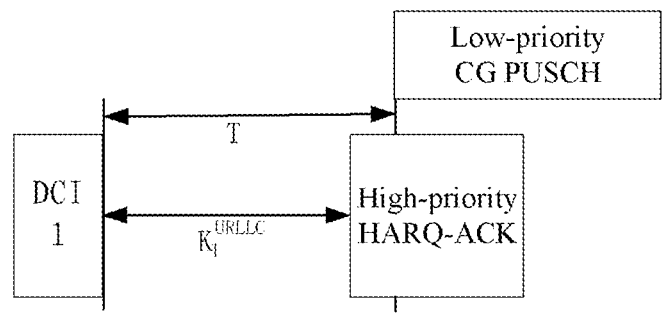
FIG. 12 is a schematic diagram 2 of a case in which a starting symbol of a URLLC HARQ-ACK PUCCH is earlier than an eMBB CG PUSCH.
Figure 13:
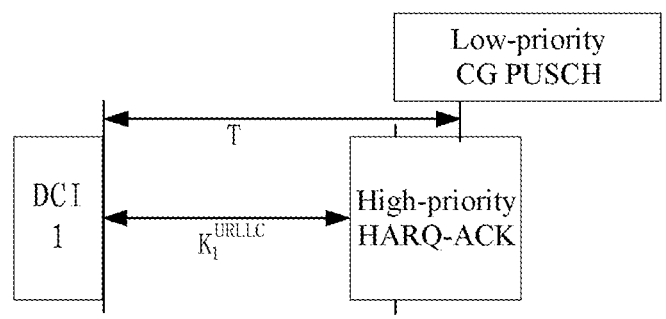
FIG. 13 is a schematic diagram 3 of a case in which a starting symbol of a URLLC HARQ-ACK PUCCH is earlier than an eMBB CG PUSCH.

For example, FIG. 8 to FIG. 13 are schematic diagrams of a case in which a high-priority channel HARQ-ACK PUCCH (for example, a URLLC HARQ-ACK PUCCH) and a low-priority channel CG PUSCH (for example, an eMBB CG PUSCH) overlap in a time domain resource (the PUCCH and the PUSCH may belong to the same serving cell or different serving cells, and when the PUCCH and the PUSCH belong to different serving cells, the serving cells of the PUCCH and the PUSCH belong to the same PUCCH group or the same cell group, that is, a master cell group MCG/a secondary cell group SCG). A high-priority HARQ-ACK PUCCH is a feedback of a PDSCH with PDCCH scheduling or a PDCCH indicating SPS PDSCH release. DCI1 is DCI (that is, last DCI corresponding to the URLLC HARQ-ACK PUCCH) corresponding to the URLLC HARQ-ACK PUCCH. The terminal cancels transmission of a low-priority CG PUSCH and transmits the high-priority HARQ-ACK PUCCH. The following time requirements need to be satisfied:

A time interval between an ending symbol of a CORESET in which DCI (that is, DCI1) corresponding to the high-priority HARQ-ACK PUCCH is located and a starting symbol of an overlapping part between the high-priority HARQ-ACK PUCCH and the low-priority CG PUSCH is greater than or equal to a time T (that is, T shown by the arrow in the figure, and corresponds to the foregoing first preset time; it should be noted that T in the embodiments of the present disclosure may be Tproc2). Specifically, FIG. 8 and FIG. 11 show a case in which the time interval between the ending symbol of the CORESET in which DCI1 is located and the starting symbol of the overlapping part is greater than T, FIG. 9 and FIG. 12 show a case in which the time interval between the ending symbol of the CORESET in which DCI1 is located and the starting symbol of the overlapping part is equal to T, and FIG. 10 and FIG. 13 show a case in which the time interval between the ending symbol of the CORESET in which DCI1 is located and the starting symbol of the overlapping part is less than T. It should be noted that T is determined by a processing capability (for example, CAP #2) corresponding to transmission of a high-priority channel.

The terminal cancels transmission of the low-priority CG PUSCH later than the ending symbol of the CORESET in which the DCI corresponding to the high-priority HARQ-ACK PUCCH is located+T, and transmits the high-priority HARQ-ACK PUCCH.

As shown in FIG. 8 and FIG. 9, the terminal cancels transmission of the low-priority CG PUSCH later than the ending symbol of the CORESET in which the DCI corresponding to the high-priority HARQ-ACK PUCCH is located+T.

As shown in FIG. 11 and FIG. 12, the terminal cancels transmission of all low-priority CG PUSCHs.

It should be noted that the cases shown in FIG. 10 and FIG. 13 are not desirable for the terminal.

2. The first object does not have corresponding DCI and the second object has corresponding DCI.

It should be noted that in this case, the terminal may transmit information by using two different implementations, specifically:

Implementation 1: Transmission of the second object is canceled and the first object is transmitted when a time interval between an ending symbol of a control resource set in which the DCI corresponding to the second object is located and a starting symbol of a first resource is greater than or equal to a first preset time.

The first resource is a symbol set of a resource overlapping part of the first object and the second object.

Further, in this case, the terminal may cancel transmission of the second object by using one of the following implementations:

Manner 1: When the time interval between the ending symbol of the control resource set in which the DCI corresponding to the second object is located and the starting symbol of the first resource is greater than or equal to the first preset time, the terminal cancels transmission of the second object later than a second moment (that is, a moment corresponding to the first preset time later than the ending symbol of the control resource set in which the DCI corresponding to the second object is located) and transmits the first object.

It should be further noted that in this case, the terminal needs to cancel transmission of all second objects if the interval between the ending symbol of the control resource set in which the DCI corresponding to the second object is located and the starting symbol of the physical resource corresponding to the second object is greater than or equal to the first preset time.

Manner 2: The terminal cancels transmission of the second object later than the starting symbol of the first resource and transmits the first object when the time interval between the ending symbol of the control resource set in which the DCI corresponding to the second object is located and the starting symbol of the first resource is greater than or equal to the first preset time.

It should be further noted that in this case, the terminal needs to cancel transmission of all second objects if the first object and the second object have the same starting symbol.

It should be noted that the terminal canceling transmission of the second object later than the starting symbol of the first resource is that the terminal at least cancels transmission of the second object later than the starting symbol of the first resource (whether to cancel transmission of the second object earlier than the starting symbol of the first resource is not limited). In other words, transmission of the second object later than the starting symbol of the first resource is not desirable for the terminal.

Figure 14:
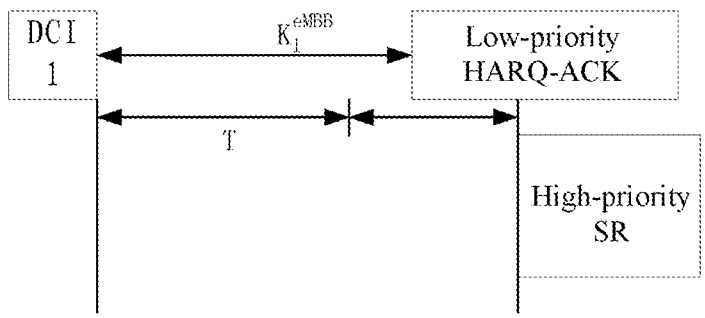
FIG. 14 is a schematic diagram 1 of a case in which a starting symbol of a URLLC SR PUCCH is later than an eMBB HARQ-ACK.
Figure 15:
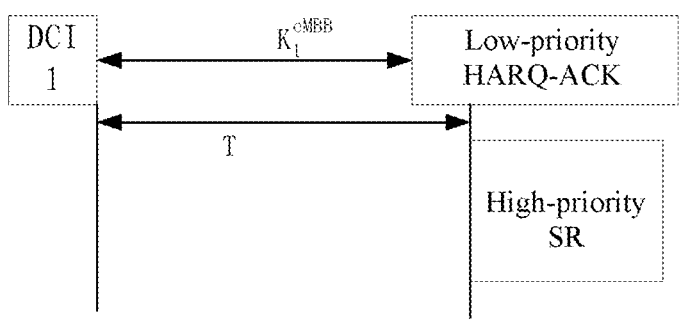
FIG. 15 is a schematic diagram 2 of a case in which a starting symbol of a URLLC SR PUCCH is later than an eMBB HARQ-ACK.
Figure 16:
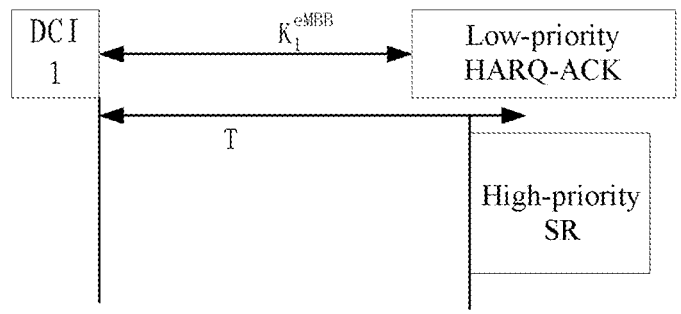
FIG. 16 is a schematic diagram 3 of a case in which a starting symbol of a URLLC SR PUCCH is later than an eMBB HARQ-ACK.
Figure 17:
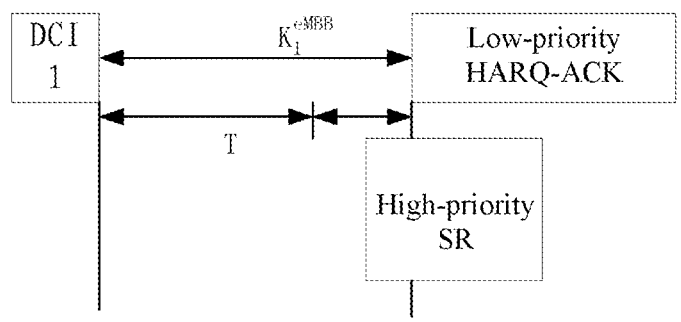
FIG. 17 is a schematic diagram 1 of a case in which a starting symbol of a URLLC SR PUCCH is earlier than an eMBB HARQ-ACK.
Figure 18:
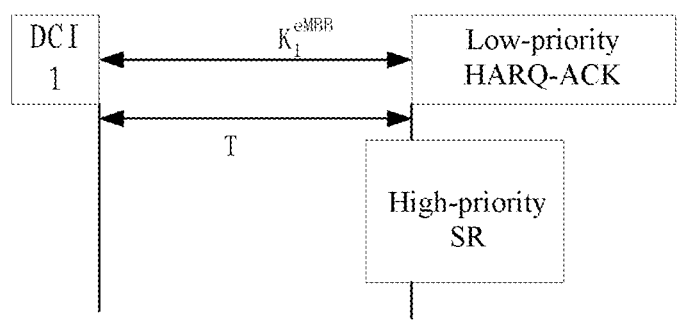
FIG. 18 is a schematic diagram 2 of a case in which a starting symbol of a URLLC SR PUCCH is earlier than an eMBB HARQ-ACK.
Figure 19:
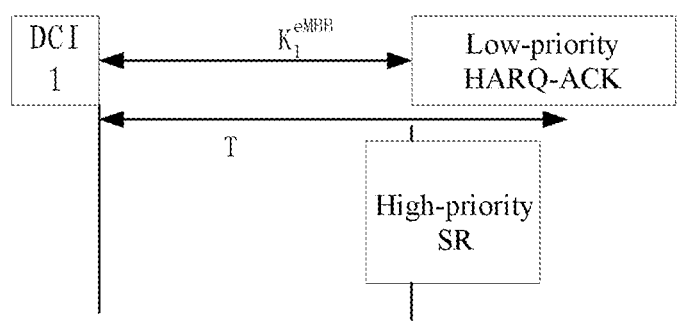
FIG. 19 is a schematic diagram 3 of a case in which a starting symbol of a URLLC SR PUCCH is earlier than an eMBB HARQ-ACK.

For example, FIG. 14 to FIG. 19 are schematic diagrams of a case in which a high-priority channel SR PUCCH (for example, a URLLC SR PUCCH) and a low-priority channel HARQ-ACK PUCCH (for example, an eMBB HARQ-ACK PUCCH) overlap in a time domain resource (the same serving cell). A low-priority HARQ-ACK PUCCH is a feedback of a PDSCH with PDCCH scheduling or a PDCCH indicating SPS PDSCH release. DCI1 is DCI (that is, last DCI corresponding to the eMBB HARQ-ACK PUCCH) corresponding to the eMBB HARQ-ACK PUCCH. The terminal cancels transmission of the low-priority HARQ-ACK PUCCH and transmits a high-priority SR PUCCH. The following time requirements need to be satisfied:

A time interval between an ending symbol of a CORESET in which DCI (that is, DCI1) corresponding to the low-priority HARQ-ACK PUCCH is located and a starting symbol of an overlapping part between the high-priority SR PUCCH and the low-priority HARQ-ACK PUCCH is greater than or equal to a time T (that is, T shown by the arrow in the figure, and corresponds to the foregoing first preset time; it should be noted that T in the embodiments of the present disclosure may be Tproc2). Specifically, FIG. 14 and FIG. 17 show a case in which the time interval between the ending symbol of the CORESET in which DCI1 is located and the starting symbol of the overlapping part is greater than T, FIG. 15 and FIG. 18 show a case in which the time interval between the ending symbol of the CORESET in which DCI1 is located and the starting symbol of the overlapping part is equal to T, and FIG. 16 and FIG. 19 show a case in which the time interval between the ending symbol of the CORESET in which DCI1 is located and the starting symbol of the overlapping part is less than T. It should be noted that T is determined by a processing capability (for example, CAP #2) corresponding to transmission of a high-priority channel.

Option 1: The terminal cancels transmission of the low-priority HARQ-ACK PUCCH part later than the ending symbol of the CORESET in which the DCI corresponding to the low-priority HARQ-ACK PUCCH is located+T.

As shown in FIG. 14, FIG. 17, and FIG. 18, the terminal cancels transmission of all low-priority CG PUSCHs.

As shown in FIG. 14 and FIG. 15, the terminal cancels transmission of a part of the low-priority HARQ-ACK PUCCH later than the starting symbol of the overlapping part between the low-priority HARQ-ACK PUCCH and the high-priority SR PUCCH.

Option 2: The terminal cancels transmission of the low-priority HARQ-ACK PUCCH later than the starting symbol of the overlapping part between the low-priority HARQ-ACK PUCCH and the high-priority SR PUCCH.

As shown in FIG. 14 and FIG. 15, the terminal cancels transmission of a part of the low-priority HARQ-ACK PUCCH later than the starting symbol of the overlapping part between the low-priority HARQ-ACK PUCCH and the high-priority SR PUCCH.

In FIG. 17 and FIG. 18, the terminal cancels transmission of all low-priority HARQ-ACK PUCCHs.

It should be noted that the cases shown in FIG. 16 and FIG. 19 are not desirable for the terminal.

Implementation 2: The terminal cancels transmission of the second object later than the starting symbol of the first resource and transmits the first object.

It should be noted that in this case, there is no time limit for transmission cancellation.

Further, the terminal needs to cancel transmission of all second objects if the first object and the second object have the same starting symbol.

In the implementation, the terminal at least cancels transmission of the second object later than the starting symbol of the first resource and transmits the first object. In particular, the terminal cancels transmission of all second objects, and transmits the first object.

3. Neither of the first object and the second object has corresponding DCI.

It should be noted that in this case, a specific implementation of step 101 is: canceling transmission of the second object later than the starting symbol of the first resource and transmitting the first object.

It should be noted that the first resource is a symbol set of a resource overlapping part of the first object and the second object.

It should be noted that in this case, there is no time limit for transmission cancellation.

Figure 20:
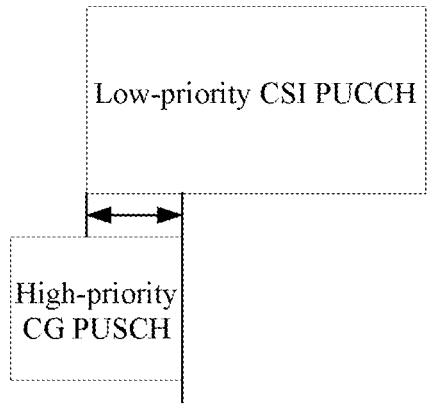
FIG. 20 is a schematic diagram of a case in which a starting symbol of a URLLC CG PUSCH is earlier than a CSI PUCCH.
Figure 21:
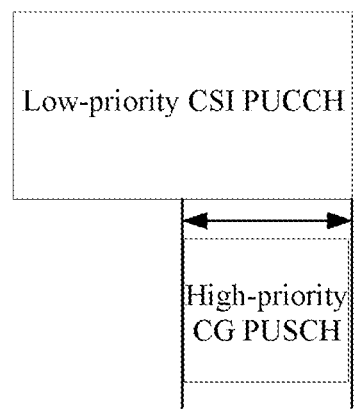
FIG. 21 is a schematic diagram 1 of a case in which a starting symbol of a URLLC CG PUSCH is later than a CSI PUCCH.
Figure 22:
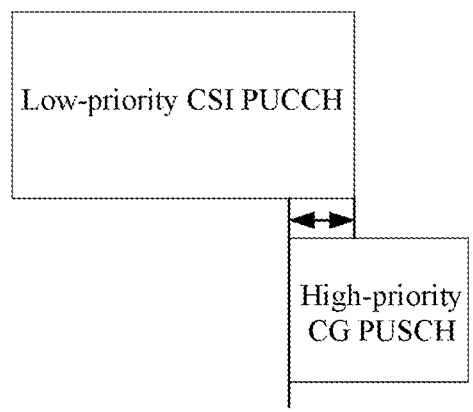
FIG. 22 is a schematic diagram 2 of a case in which a starting symbol of a URLLC CG PUSCH is later than a CSI PUCCH.

For example, FIG. 20 to FIG. 22 are schematic diagrams of a case in which a low-priority channel CSI PUCCH and a high-priority CG PUSCH (for example, a URLLC CG PUSCH) overlap in a time domain resource (the CSI PUCCH and the high-priority CG PUSCH belong to the same serving cell or different serving cells). The CSI PUCCH may be a P-CSI PUCCH or an SP-CSI on PUCCH, that is, a physical uplink control channel sent for periodic CSI or periodic CSI after MAC triggering. The high-priority CG PUSCH may be a type 1 CG PUSCH or a type 2 CG PUSCH. The two channels overlap (partially or completely overlap) in time. The terminal discards the low-priority channel CSI PUCCH and transmits the high-priority CG PUSCH. Because neither of the two channels has corresponding DCI scheduling, it is not necessary to define a corresponding discarding/canceling time line, but instead the two channels depend on an implementation of the terminal. FIG. 20 to FIG. 22 respectively show relationships between a transmission time of the high-priority CG PUSCH and a transmission time of the CSI PUCCH. The relationships are respectively that a starting symbol of the high-priority CG PUSCH is earlier than the low-priority CSI PUSCH, the starting symbol of the high-priority CG PUSCH is later than the low-priority CSI PUSCH and an ending symbol of the high-priority CG PUSCH is earlier than a low-priority CSI PUCCH, and the starting symbol of the high-priority CG PUSCH is later than the low-priority CSI PUSCH and the ending symbol of the high-priority CG PUSCH is later than the low-priority CSI PUCCH. Among the foregoing three scenarios, in the scenario shown in FIG. 20, the terminal does not start transmission of the low-priority CSI PUCCH, that is, cancels transmission of all low-priority CSI PUCCHs. In the scenarios shown in FIG. 21 and FIG. 22, the terminal may partially transmit the low-priority CSI PUCCH (or may not transmit the low-priority CSI PUCCH), but the terminal (at least) cancels transmission of the remaining part of the low-priority CSI PUCCH starting from the starting symbol of the PUSCH.

It should be noted that for every channel HARQ-ACK, CSI SR, and PUSCH, the terminal may determine a priority of the channel according to RRC configuration, corresponding scheduled or activated DCI, a corresponding logical channel priority, and the like. This is not limited in the present disclosure.

It should further be noted that the ending symbol of the CORESET in the time interval between the ending symbol of the CORESET in which the DCI is located and the starting symbol of the overlapping part is an ending boundary (ending boundary) corresponding to the ending symbol, and the starting symbol of the overlapping part is a starting/beginning boundary (starting/beginning boundary) corresponding to the starting symbol.

It should further be noted that to ensure consistent understanding of the terminal and the network side device, a manner of transmission of the terminal is the same as a manner of reception of the network side device.

Embodiments of the present disclosure provide a time limit for a terminal to cancel transmission of a low-priority channel/signal when a high-priority channel/signal and a low-priority channel/signal overlap in time domain resources for hybrid services, so that effective transmission of a high-priority physical channel or signal can be ensured, thereby improving the effectiveness of a communication system.

Figure 23:
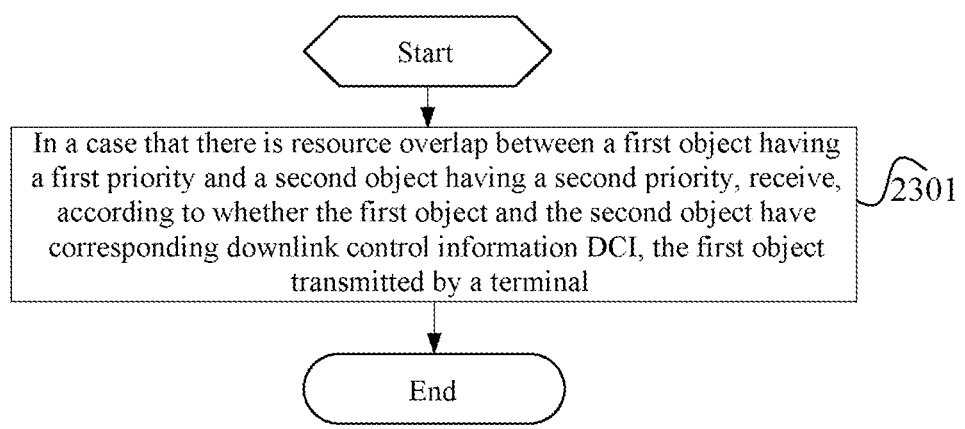
FIG. 23 is a schematic flowchart of an information receiving method according to an embodiment of the present disclosure.

As shown in FIG. 23, embodiments of the present disclosure further provide an information receiving method, applied to a network side device, and including the following steps.

Step 2301: In a case that there is resource overlap between a first object having a first priority and a second object having a second priority, receive, according to whether the first object and the second object have corresponding downlink control information DCI, the first object transmitted by a terminal.

The first object includes a first physical channel or a first signal, and the second object includes a second physical channel or a second signal.

The first priority is higher than the second priority.

Optionally, in a case that at least one of the first object or the second object has corresponding DCI, the information receiving method further includes:

sending DCI of a target object to the terminal,
the target object being the first object and/or the second object, a time interval between an ending symbol of a control resource set in which target DCI is located and a starting symbol of a first resource being greater than or equal to a first preset time,
the target DCI being DCI closest to the first resource in DCI of the target object, the first resource being a symbol set of a resource overlapping part of the first object and the second object.

It should be noted that all the descriptions about the network side device in the foregoing embodiments are applicable to the embodiment of the information receiving method and can also achieve the same technical effect. Details are not described herein again.

Figure 24:
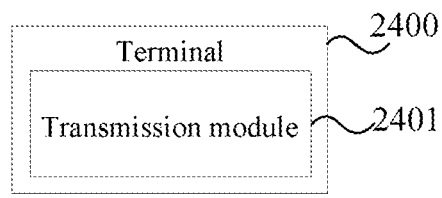
FIG. 24 is a schematic modular diagram of a terminal according to an embodiment of the present disclosure.

As shown in FIG. 24, an embodiment of the present disclosure provides a terminal 2400, including:

a transmission module 2401, configured to: in a case that there is resource overlap between a first object having a first priority and a second object having a second priority, cancel transmission of the second object and transmit the first object according to whether the first object and the second object have corresponding downlink control information DCI, the first object including a first physical channel or a first signal, the second object including a second physical channel or a second signal, the first priority being higher than the second priority.

Optionally, the transmission module 2401 includes at least one of the following:

a first transmission unit, configured to: in a case that the first object has corresponding DCI, cancel transmission of the second object and transmit the first object when a time interval between an ending symbol of a control resource set in which the DCI corresponding to the first object is located and a starting symbol of a first resource is greater than or equal to a first preset time;

a second transmission unit, configured to: in a case that the first object does not have corresponding DCI and the second object has corresponding DCI, cancel transmission of the second object and transmit the first object when a time interval between an ending symbol of a control resource set in which the DCI corresponding to the second object is located and a starting symbol of a first resource is greater than or equal to a first preset time;

a third transmission unit, configured to: in a case that the first object does not have corresponding DCI and the second object has corresponding DCI, cancel transmission of the second object later than a starting symbol of a first resource and transmit the first object; or a fourth transmission unit, configured to: in a case that neither of the first object and the second object has corresponding DCI, cancel transmission of the second object later than a starting symbol of a first resource and transmit the first object, the first resource being a symbol set of a resource overlapping part of the first object and the second object.

Further, in a case that the first object has corresponding DCI, an implementation of canceling transmission of the second object by the first transmission unit is:

canceling transmission of the second object later than a first moment, the first moment being a moment corresponding to the first preset time later than the ending symbol of the control resource set in which the DCI corresponding to the first object is located.

Specifically, an implementation of the canceling transmission of the second object later than a first moment of the first transmission unit is:

canceling, by the terminal, transmission of all second objects when an interval between the ending symbol of the control resource set in which the DCI corresponding to the first object is located and a starting symbol of a physical resource corresponding to the second object is greater than or equal to the first preset time.

Further, in a case that the first object does not have corresponding DCI and the second object has corresponding DCI, an implementation of canceling transmission of the second object by the second transmission unit is:

canceling transmission of the second object later than a second moment; or canceling transmission of the second object later than the starting symbol of the first resource, the second moment being a moment corresponding to the first preset time later than the ending symbol of the control resource set in which the DCI corresponding to the second object is located.

It should be noted that the terminal embodiment is about a terminal corresponding to the foregoing information transmission method applied to a terminal. All implementations in the foregoing embodiments are applicable to the terminal embodiment and can also achieve the same technical effect.

Figure 25:
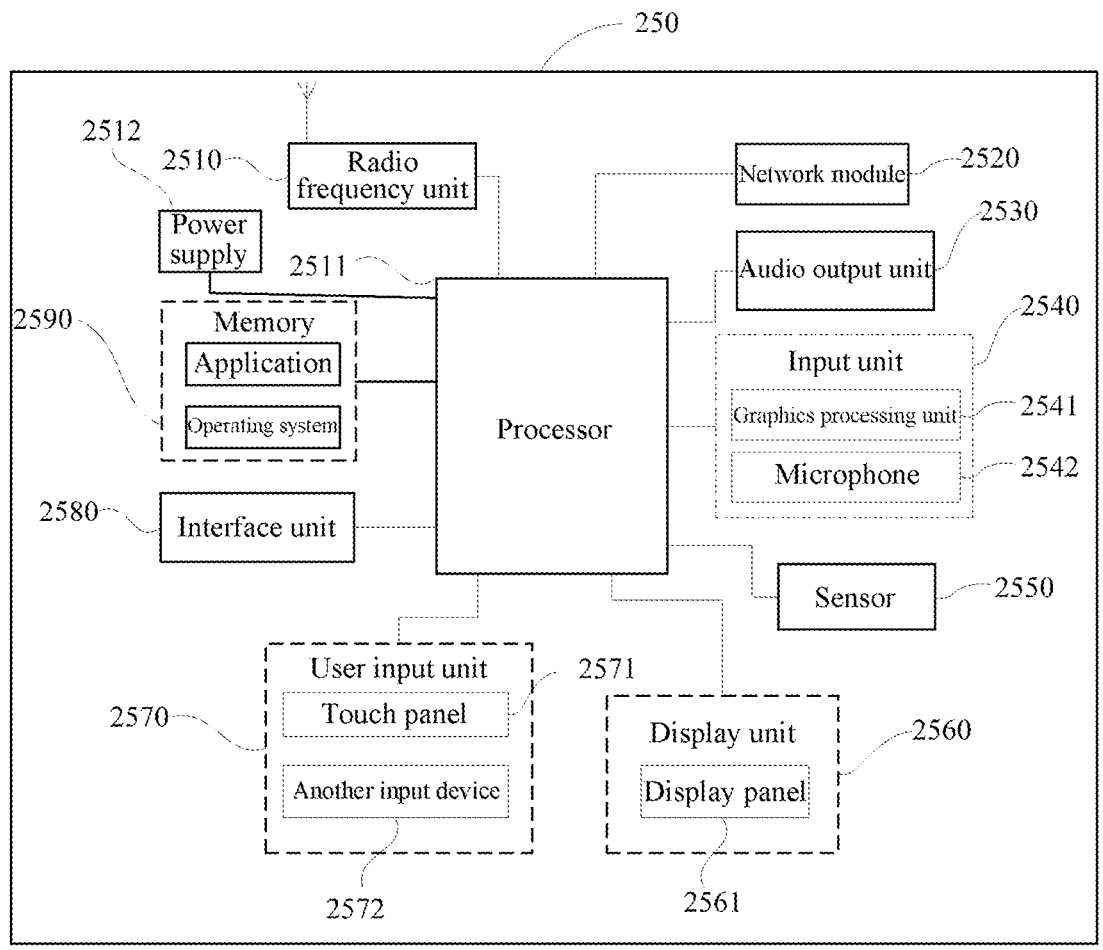
FIG. 25 is a structural block diagram of a terminal according to an embodiment of the present disclosure.

FIG. 25 is a schematic diagram of a hardware structure of a terminal according to an embodiment of the present disclosure.

A terminal 250 includes, but is not limited to, components such as a radio frequency unit 2510, a network module 2520, an audio output unit 2530, an input unit 2540, a sensor 2550, a display unit 2560, a user input unit 2570, an interface unit 2580, a memory 2590, a processor 2511, and a power supply 2512. A person skilled in the art may understand that a terminal structure shown in FIG. 25 constitutes no limitation on the terminal, and the terminal may include more or fewer components than those shown in the figure, or some components may be combined, or a different component deployment may be used. In the embodiments of the present disclosure, the terminal includes, but is not limited to, a mobile phone, a tablet computer, a notebook computer, a palmtop computer, an in-vehicle terminal, a wearable device, a pedometer, and the like.

The processor 2511 is configured to: in a case that there is resource overlap between a first object having a first priority and a second object having a second priority, cancel transmission of the second object and transmit the first object according to whether the first object and the second object have corresponding downlink control information DCI the first object including a first physical channel or a first signal, the second object including a second physical channel or a second signal, the first priority being higher than the second priority.

In a case that there is resource overlap between a first object having a first priority and a second object having a second priority, the terminal in the embodiments of the present disclosure cancels transmission of the second object and transmits the first object according to whether the first object and the second object have corresponding downlink control information DCI, so that effective transmission of a high-priority physical channel or signal can be ensured, thereby ensuring the reliability of communication.

It should be understood that in the embodiments of the present disclosure, the radio frequency unit 2510 may be configured to receive and send a signal during an information receiving and sending process or a call process. Specifically, the radio frequency unit receives downlink data from a network side device, and then delivers the downlink data to the processor 2511 for processing; and in addition, sends uplink data to the network side device. Generally, the radio frequency unit 2510 includes, but is not limited to, an antenna, at least one amplifier, a transceiver, a coupler, a low noise amplifier, a duplexer, and the like. In addition, the radio frequency unit 2510 may further communicate with another device through a wireless communication system.

The terminal provides wireless broadband Internet access for a user by using the network module 2520, for example, helps the user to receive and send an email, browse a web page, and access stream media, and the like.

The audio output unit 2530 may convert audio data received by the radio frequency unit 2510 or the network module 2520 or stored in the memory 2590 into an audio signal and output the audio signal as sound. Moreover, the audio output unit 2530 may provide an audio output (such as call signal receiving sound or message receiving sound) related to a specific function executed by the terminal 250. The audio output unit 2530 includes a loudspeaker, a buzzer, a receiver, and the like.

The input unit 2540 is configured to receive an audio signal or a video signal. The input unit 2540 may include a graphics processing unit (GPU) 2541 and a microphone 2542. The GPU 2541 processes image data of a static picture or a video that is obtained by an image acquisition apparatus (for example, a camera) in a video acquisition mode or an image acquisition mode. An image frame that has been processed may be displayed on a display unit 2560. The image frame that has been processed by the GPU 2541 may be stored in the memory 2590 (or another storage medium) or sent by using the radio frequency unit 2510 or the network module 2520. The microphone 2542 may receive a sound, and can process the sound into audio data. The processed audio data may be converted, in a phone talk mode, into a format that may be sent to a mobile communication network side device via the radio frequency unit 2510 for output.

The terminal 250 further includes at least one sensor 2550 such as an optical sensor, a motion sensor, and other sensors. Specifically, the optical sensor includes an ambient light sensor and a proximity sensor, where the ambient light sensor may adjust luminance of the display panel 2561 according to the luminance of the ambient light, and the proximity sensor may switch off the display panel 2561 and/or backlight when the terminal 250 is moved to the ear. As one type of motion sensor, an acceleration sensor may detect magnitude of accelerations in various directions (generally on three axes), may detect magnitude and a direction of the gravity when static, and may be configured to recognize the attitude of the mobile phone (for example, switching between landscape orientation and portrait orientation, a related game, and magnetometer attitude calibration), a function related to vibration recognition (such as a pedometer and a knock), and the like. The sensor 2550 may further include a fingerprint sensor, a pressure sensor, an iris sensor, a molecular sensor, a gyroscope, a barometer, a hygrometer, a thermometer, and an infrared sensor, and the like. Details are not described herein again.

The display unit 2560 is configured to display information input by the user or information provided for the user. The display unit 2560 may include a display panel 2561. The display panel 2561 may be configured in the form of a liquid crystal display (LCD), an organic light-emitting diode (OLED), or the like.

The user input unit 2570 may be configured to receive input digit or character information, and generate key signal input related to the user setting and function control of the terminal. Specifically, the user input unit 2570 includes a touch panel 2571 and another input device 2572. The touch panel 2571, also referred to as a touchscreen, may collect a touch operation of a user on or near the touch panel (such as an operation of a user on or near the touch panel 2571 by using any suitable object or attachment, such as a finger or a touch pen). The touch panel 2571 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 2511. Moreover, the touch controller receives and executes a command sent from the processor 2511. In addition, the touch panel 2571 may be implemented by using various types, such as a resistive type, a capacitive type, an infrared type, and a surface acoustic wave type. In addition to the touch panel 2571, the user input unit 2570 may further include the another input device 2572. Specifically, the another input device 2572 may include, but not limited to, a physical keyboard, a functional key (such as a volume control key or a switch key), a track ball, a mouse, and a joystick. Details are not described herein again.

Further, the touch panel 2571 may cover the display panel 2561. After detecting a touch operation on or near the touch panel 2571, the touch panel 2571 transfers the touch operation to the processor 2511, so as to determine a type of the touch event. Then, the processor 2511 provides corresponding visual output on the display panel 2561 according to the type of the touch event. Although, in FIG. 25, the touch panel 2571 and the display panel 2561 are used as two separate parts to implement input and output functions of the terminal, in some embodiments, the touch panel 2571 and the display panel 2561 may be integrated to implement the input and output functions of the terminal, which are not limited herein.

The interface unit 2580 is an interface for connecting an external apparatus to the terminal 250. For example, the external apparatus may include a wired or wireless headset port, an external power supply (or a battery charger) port, a wired or wireless data port, a storage card port, a port used to connect an apparatus having an identification module, an audio input/output (I/O) port, a video I/O port, an earphone port, and the like. The interface unit 2580 may be configured to receive an input (such as data information or electric power) from an external apparatus and transmit the received input to one or more elements in the terminal 250 or may be configured to transmit data between the terminal 250 and an external apparatus.

The memory 2590 may be configured to store a software program and various data. The memory 2590 may mainly include a program storage region and a data storage region. The program storage region may store an operating system, an application program (such as a sound play function or an image play function) that is required by at least one function, and the like. The data storage region may store data (such as audio data or a phonebook) that is created according to use of the mobile phone, and the like. In addition, the memory 2590 may include a high-speed random access memory, and may further include a nonvolatile memory, such as at least one magnetic disk storage device, a flash memory, or another volatile solid-state storage device.

The processor 2511 is the control center of the terminal, and is connected to various parts of the terminal by using various interfaces and lines. By running or executing the software program and/or module stored in the memory 2590, and invoking data stored in the memory 2590, the processor 2511 performs various functions and data processing of the terminal, thereby performing overall monitoring on the terminal. The processor 2511 may include one or more processing units. Optionally, the processor 2511 may integrate an application processor and a modem processor. The application processor mainly processes an operating system, a user interface, an application, and the like. The modem processor mainly processes wireless communication. It may be understood that the modulation and demodulation processor may not be integrated into the processor 2511.

The terminal 250 further includes a power supply 2512 (such as a battery) for supplying power to the components. Optionally, the power supply 2512 may be logically connected to the processor 2511 by using a power management system, thereby implementing functions such as charging, discharging, and power consumption management by using the power management system.

In addition, the terminal 250 includes some functional modules that are not shown. Details are not described herein again.

Optionally, an embodiment of the present disclosure further provides a terminal, including a processor 2511, a memory 2590, and a computer program stored in the memory 2590 and capable of being run on the processor 2511, where the computer program implements various processes of the embodiments of the information transmission method applied to a terminal side when being executed by the processor 2511, and can achieve the same technical effects. To avoid repetition, details are not described herein again.

An embodiment of the present disclosure further provides a computer-readable storage medium, storing a computer program, where the computer program, when executed by a processor, implements various processes of the embodiments of the information transmission method applied to a terminal side, and can achieve the same technical effects. To avoid repetition, details are not described herein again. The computer-readable storage medium is, for example, a read-only memory (ROM), a random access memory (RAM), a magnetic disk, an optical disc, or the like.

Figure 26:
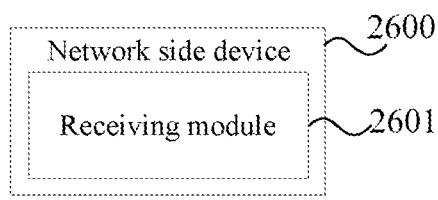
FIG. 26 is a schematic modular diagram of a network side device according to an embodiment of the present disclosure.

As shown in FIG. 26, an embodiment of the present disclosure further provides a network side device 2600, including:
  a receiving module 2601, configured to: in a case that there is resource overlap between a first object having a first priority and a second object having a second priority, receive, according to whether the first object and the second object have corresponding downlink control information DCI, the first object transmitted by a terminal,
  the first object including a first physical channel or a first signal, the second object including a second physical channel or a second signal,
  the first priority being higher than the second priority.

Optionally, in a case that at least one of the first object or the second object has corresponding DCI, the network side device 2600 further includes:
  a sending module, configured to send DCI of a target object to the terminal,
  the target object being the first object and/or the second object, a time interval between an ending symbol of a control resource set in which target DCI is located and a starting symbol of a first resource being greater than or equal to a first preset time,
  the target DCI being DCI closest to the first resource in DCI of the target object, the first resource being a symbol set of a resource overlapping part of the first object and the second object.

An embodiment of the present disclosure further provides a network side device, including a memory, a processor, and a computer program stored in the memory and capable of being run on the processor, where the computer program implements various processes of the embodiments of the foregoing information receiving method applied to the network side device when being executed by the processor, and can achieve the same technical effects. To avoid repetition, details are not described herein again.

An embodiment of the present disclosure further provides a computer-readable storage medium, storing a computer program, where the computer program, when executed by a processor, implements various processes of the embodiments of the foregoing information receiving method applied to a network side device, and can achieve the same technical effects. To avoid repetition, details are not described herein again. The computer-readable storage medium is, for example, a read-only memory (ROM), a random access memory (RAM), a magnetic disk, an optical disc, or the like.

Figure 27:
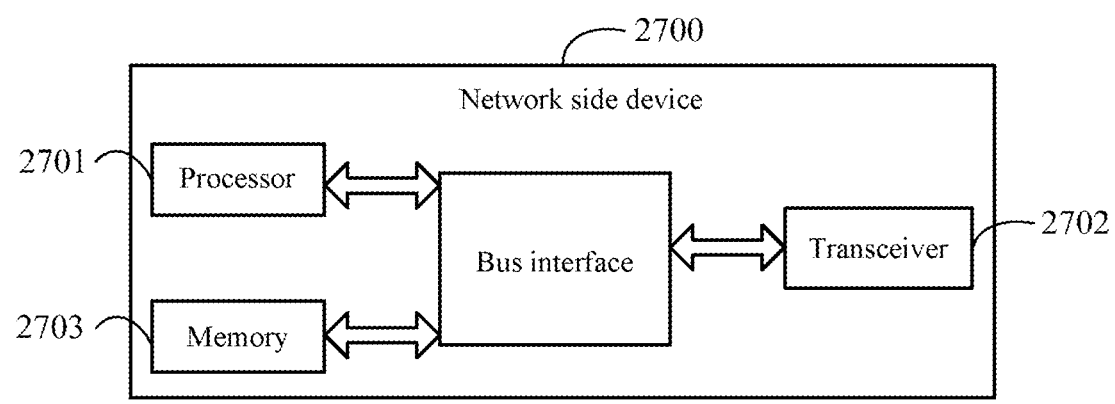
FIG. 27 is a structural block diagram of a network side device according to an embodiment of the present disclosure.

FIG. 27 is a structural diagram of a network side device according to an embodiment of the present disclosure. The network side device can implement details of the foregoing information receiving method, and can achieve the same effect. As shown in FIG. 27, the network side device 2700 includes a processor 2701, a transceiver 2702, a memory 2703, and a bus interface.

The processor 2701 is configured to read a program in the memory 2703 to perform the following process:
  in a case that there is resource overlap between a first object having a first priority and a second object having a second priority, receiving, by the transceiver 2702 according to whether the first object and the second object have corresponding downlink control information DCI, the first object transmitted by a terminal,
  the first object including a first physical channel or a first signal, the second object including a second physical channel or a second signal,
  the first priority being higher than the second priority.

In FIG. 27, a bus architecture may include any quantity of interconnected buses and bridges, and specifically connects together circuits that are of one or more processors represented by the processor 2701 and of a memory represented by the memory 2703. The bus architecture may further connect various other circuits of a peripheral device, a voltage regulator, a power management circuit, and the like. This is well known in the art, and therefore, no further description is provided in this specification. The bus interface provides an interface. The transceiver 2702 may be a plurality of components, including a transmitter and a receiver, and providing units for communicating with various other apparatuses on a transmission medium.

Optionally, in a case that at least one of the first object or the second object has corresponding DCI, the processor 2701 is configured to read the program in the memory 2703 to further perform the following process:
  sending, by the transceiver 2702, DCI of a target object to the terminal,
  the target object being the first object and/or the second object, a time interval between an ending symbol of a control resource set in which target DCI is located and a starting symbol of a first resource being greater than or equal to a first preset time,
  the target DCI being DCI closest to the first resource in DCI of the target object, the first resource being a symbol set of a resource overlapping part of the first object and the second object.

The network side device may be a base transceiver station (BTS) in a Global System for Mobile Communications (GSM) or code division multiple access (CDMA), or may be a base station (NodeB, NB) in wideband code division multiple access (WCDMA), or may be an evolved base station (Evolved Node B, eNB or e-NodeB) in LTE, or a relay station or an access point, or a base station in a future 5G network. This is not limited herein.

The foregoing descriptions are optional implementations of the present disclosure. A person of ordinary skill in the art may make improvements and refinements without departing from the principle of the present disclosure. All such modifications and refinements also fall within the protection scope of the present disclosure.

What is claimed is:

1. An information transmission method, applied to a terminal, and comprising:
   in a case that there is resource overlap between a first object having a first priority and a second object having a second priority, canceling transmission of the second object and transmitting the first object according to whether the first object has corresponding downlink control information DCI,
   the first object comprising a first physical channel or a first signal, the second object comprising a second physical channel or a second signal,
   the first priority being higher than the second priority;
   wherein the canceling transmission of the second object and transmitting the first object according to whether the first object has corresponding downlink control information DCI comprises at least one of the following:
   in a case that the first object has corresponding DCI, canceling transmission of the second object and transmitting the first object when a time interval between an ending symbol of a control resource set in which the DCI corresponding to the first object is located and a starting symbol of a first resource is greater than or equal to a first preset time;
   in a case that the first object does not have corresponding DCI and the second object has corresponding DCI, canceling transmission of the second object and transmitting the first object when a time interval between an ending symbol of a control resource set in which the DCI corresponding to the second object is located and a starting symbol of a first resource is greater than or equal to a first preset time;
   in a case that the first object does not have corresponding DCI, canceling transmission of the second object later than a starting symbol of a first resource and transmitting the first object;
   the first resource being a symbol set of a resource overlapping part of the first object and the second object.

2. The information transmission method according to claim 1, wherein the canceling transmission of the second object and transmitting the first object according to whether the first object has corresponding downlink control information DCI further comprises at least one of the following:
   in a case that the first object does not have corresponding DCI and the second object has corresponding DCI, canceling transmission of the second object later than a starting symbol of a first resource and transmitting the first object; or
   in a case that neither of the first object and the second object has corresponding DCI, canceling transmission of the second object later than a starting symbol of a first resource and transmitting the first object.

3. The information transmission method according to claim 1, wherein the canceling transmission of the second object in a case that the first object has corresponding DCI comprises:
   canceling transmission of the second object later than a first moment,
   the first moment being a moment corresponding to the first preset time later than the ending symbol of the control resource set in which the DCI corresponding to the first object is located.

4. The information transmission method according to claim 3, wherein the canceling transmission of the second object later than a first moment comprises:
   canceling, by the terminal, transmission of all second objects when an interval between the ending symbol of the control resource set in which the DCI corresponding to the first object is located and a starting symbol of a physical resource corresponding to the second object is greater than or equal to the first preset time.

5. The information transmission method according to claim 1, wherein the canceling transmission of the second object in a case that the first object does not have corresponding DCI and the second object has corresponding DCI comprises:
   canceling transmission of the second object later than a second moment; or
   canceling transmission of the second object later than the starting symbol of the first resource,
   the second moment being a moment corresponding to the first preset time later than the ending symbol of the control resource set in which the DCI corresponding to the second object is located.

6. A network side device, comprising a memory, a processor, and a computer program stored in the memory and capable of being run on the processor, wherein the computer program is executed by the processor to implement the steps of the foregoing information receiving method, wherein the method comprises:
   in a case that there is resource overlap between a first object having a first priority and a second object having a second priority, receiving, according to whether the first object has corresponding downlink control information DCI, the first object transmitted by a terminal,
   the first object comprising a first physical channel or a first signal, the second object comprising a second physical channel or a second signal,
   the first priority being higher than the second priority;
   wherein in a case that at least one of the first object or the second object has corresponding DCI, the information receiving method further comprises:
   sending DCI of a target object to the terminal,
   the target object being the first object and/or the second object, a time interval between an ending symbol of a control resource set in which target DCI is located and a starting symbol of a first resource being greater than or equal to a first preset time,
   the target DCI being DCI closest to the first resource in DCI of the target object, the first resource being a symbol set of a resource overlapping part of the first object and the second object.

7. A terminal, comprising a memory, a processor, and a computer program stored in the memory and capable of being run on the processor, wherein the computer program is executed by the processor to implement the steps of the foregoing information transmission method, wherein the method comprises:
   in a case that there is resource overlap between a first object having a first priority and a second object having a second priority, canceling transmission of the second object and transmitting the first object according to whether the first object has corresponding downlink control information DCI, the first object comprising a first physical channel or a first signal, the second object comprising a second physical channel or a second signal, the first priority being higher than the second priority;

wherein the canceling transmission of the second object and transmitting the first object according to whether the first object has corresponding downlink control information DCI comprises at least one of the following:

in a case that the first object has corresponding DCI, canceling transmission of the second object and transmitting the first object when a time interval between an ending symbol of a control resource set in which the DCI corresponding to the first object is located and a starting symbol of a first resource is greater than or equal to a first preset time;

in a case that the first object does not have corresponding DCI and the second object has corresponding DCI, canceling transmission of the second object and transmitting the first object when a time interval between an ending symbol of a control resource set in which the DCI corresponding to the second object is located and a starting symbol of a first resource is greater than or equal to a first preset time;

in a case that the first object does not have corresponding DCI, canceling transmission of the second object later than a starting symbol of a first resource and transmitting the first object;

the first resource being a symbol set of a resource overlapping part of the first object and the second object.

8. The terminal according to claim 7, wherein the canceling transmission of the second object and transmitting the first object according to whether the first object has corresponding downlink control information DCI further comprises at least one of the following:

in a case that the first object does not have corresponding DCI and the second object has corresponding DCI, canceling transmission of the second object later than a starting symbol of a first resource and transmitting the first object; or in a case that neither of the first object and the second object has corresponding DCI, canceling transmission of the second object later than a starting symbol of a first resource and transmitting the first object.

9. The terminal according to claim 7, wherein the canceling transmission of the second object in a case that the first object has corresponding DCI comprises:

canceling transmission of the second object later than a first moment, the first moment being a moment corresponding to the first preset time later than the ending symbol of the control resource set in which the DCI corresponding to the first object is located.

10. The terminal according to claim 9, wherein the canceling transmission of the second object later than a first moment comprises:

canceling, by the terminal, transmission of all second objects when an interval between the ending symbol of the control resource set in which the DCI corresponding to the first object is located and a starting symbol of a physical resource corresponding to the second object is greater than or equal to the first preset time.

11. The terminal according to claim 7, wherein the canceling transmission of the second object in a case that the first object does not have corresponding DCI and the second object has corresponding DCI comprises:

canceling transmission of the second object later than a second moment; or canceling transmission of the second object later than the starting symbol of the first resource, the second moment being a moment corresponding to the first preset time later than the ending symbol of the control resource set in which the DCI corresponding to the second object is located.

12. A computer-readable storage medium, storing a computer program, wherein the computer program is executed by a processor to implement the steps of the information transmission method according to claim 1.

* * * * *